J. G. SIMS.
Fertilizer Distributors.

No. 195,959. Patented Oct. 9, 1877.

WITNESSES:
H. Rydquist
J. N. Scarborough

INVENTOR:
J. G. Sims
BY
Munn & Co
ATTORNEYS

UNITED STATES PATENT OFFICE.

JESSE G. SIMS, OF SUMMERVILLE, GEORGIA.

IMPROVEMENT IN FERTILIZER-DISTRIBUTERS.

Specification forming part of Letters Patent No. 195,959, dated October 9, 1877; application filed August 11, 1877.

*To all whom it may concern:*

Figure 1:
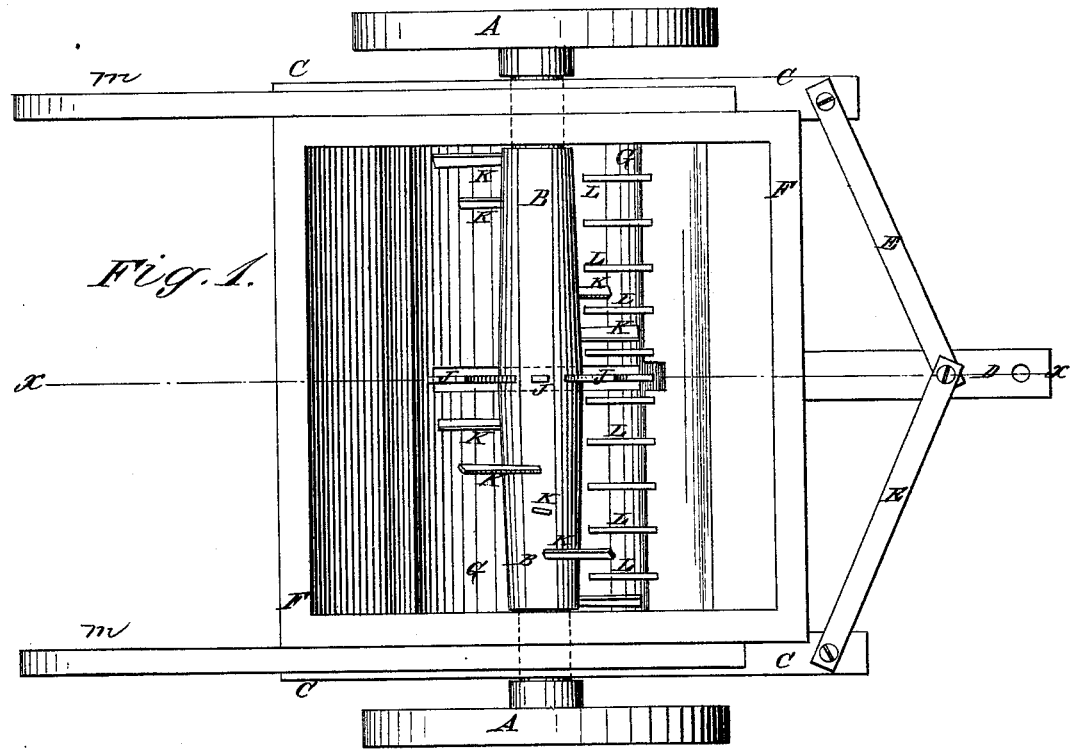
Figure 2:
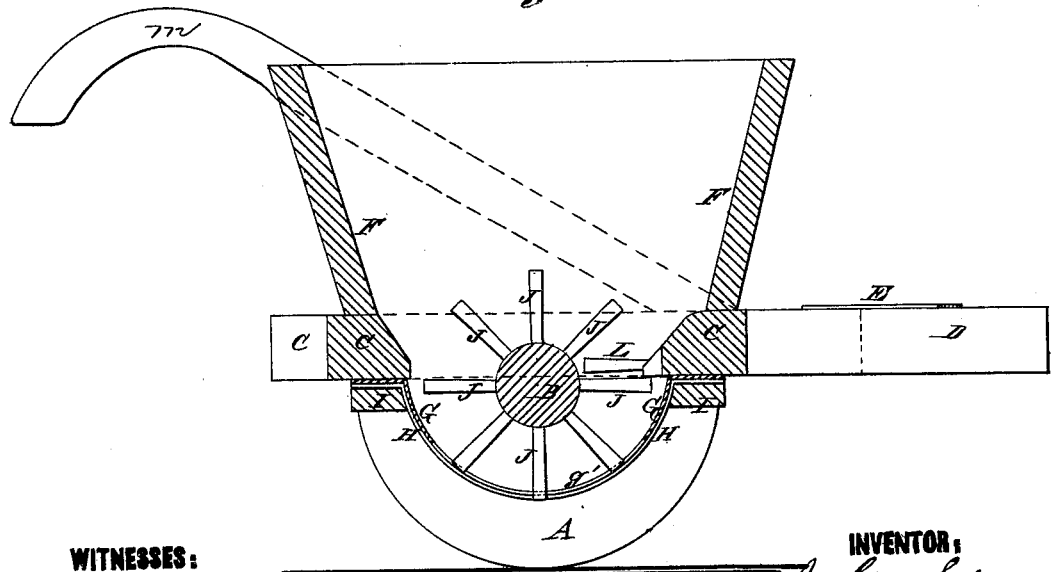

Be it known that I, JESSE G. SIMS, of Summerville, in the county of Chattooga and State of Georgia, have invented a new and useful Improvement in Fertilizer-Distributers, of which the following is a specification:

Figure 1 is a top view of my improved machine. Fig. 2 is a vertical longitudinal section of the same, taken through the line $x\,x$, Fig. 1.

Similar letters of reference indicate corresponding parts.

The object of this invention is to furnish an improved machine for distributing stable-manure, compost, guano, and other coarse or fine fertilizers, which shall be so constructed as to cut up or grind the fertilizers into powder, and distribute them evenly and rapidly, and which shall be simple in construction and convenient in use.

The invention consists in the combination of the shaft, the circle of teeth, the two spiral rows of teeth, and the row of stationary teeth with the wheels, the frame, the hopper, and the semi-cylindrical bottom having a slot formed in its middle part, as hereinafter fully described.

A are the wheels, which are rigidly attached to the ends of the shaft B. The journals of the shaft B revolve in bearings attached to the frame C.

To the forward part of the frame C is attached the draw-bar D, which is strengthened against side strain by the braces E, attached to it and to the forward corners of the frame C.

To the upper side of the frame C is attached a box or hopper, F, of such a size as to contain the desired amount of the fertilizer.

To the lower side of the frame C are attached the edges of the semi-cylindrical sheet-metal bottom G, in the middle part of which is formed a slot, $g'$, through which the fertilizer is distributed.

H are two bands, which pass beneath the bottom G at the opposite sides of the slot $g'$, and the ends of which pass beneath cleats I, attached to the frame C, so that the said bands may be moved toward or from each other, to contract or expand the discharge-slot $g'$, according as less or more of the fertilizer is to be distributed.

To the center of the shaft B is attached a circle of arms or teeth, J, of such a length as to pass through the slot $g'$ of the bottom G and push out the fertilizer.

To the shaft B, upon each side of its center, is attached a spiral row of arms or teeth, of such a length as to reach to, or nearly to, the bottom G, and which, as the shaft B revolves, move the fertilizer toward the slot $g'$, so that it may be pushed out by the teeth J.

To the front cross-bar of the frame C is attached a row of teeth, L, so arranged that the teeth K may pass between them, so that the fertilizer may be broken into small pieces, or ground to powder before it reaches the slot $g'$.

The teeth L are made of such a length as to reach to, or nearly to, the shaft B.

M are the handles, which are attached to the sides of the hopper F, and the forward ends of which are attached to the frame C.

Having thus described my invention, I claim as new and desire to secure by Letters Patent—

The combination of the shaft B, the circle of teeth J, the two spiral rows of teeth K, and the row of stationary teeth L with the wheels A, the frame C, the hopper F, and the semi-cylindrical bottom G, having a slot, $g'$, formed in its middle part, substantially as herein shown and described.

JESSE GREEN SIMS.

Witnesses:
 THOMPSON HILES,
 E. N. MARTIN.